(12) United States Patent
Mostert et al.

(10) Patent No.: US 12,369,557 B2
(45) Date of Patent: Jul. 29, 2025

(54) AUTOMATIC MILK VALVE

(71) Applicant: LELY PATENT N.V., Maassluis (NL)

(72) Inventors: Gerard Mostert, Schipluiden (NL); Dirk Kraaij, Delft (NL); Dimitri Björn De Kort, Leidschendam (NL)

(73) Assignee: LELY PATENT N.V., Maassluis (NL)

( * ) Notice: Subject to any disclaimer, the term of this patent is extended or adjusted under 35 U.S.C. 154(b) by 188 days.

(21) Appl. No.: 18/252,429

(22) PCT Filed: Nov. 25, 2021

(86) PCT No.: PCT/IB2021/060955
§ 371 (c)(1),
(2) Date: May 10, 2023

(87) PCT Pub. No.: WO2022/112981
PCT Pub. Date: Jun. 2, 2022

(65) Prior Publication Data
US 2024/0008443 A1    Jan. 11, 2024

(30) Foreign Application Priority Data

Nov. 25, 2020    (NL) ..................................... 2026979

(51) Int. Cl.
*A01J 7/02*    (2006.01)
*F16K 27/02*    (2006.01)

(52) U.S. Cl.
CPC ............... *A01J 7/022* (2013.01); *F16K 27/02* (2013.01); *F16K 27/0281* (2013.01)

(58) Field of Classification Search
CPC . A01J 7/022; A01J 7/02; F16K 11/207; F16K 27/063; F16K 27/0281; F16K 27/02
See application file for complete search history.

(56) References Cited

U.S. PATENT DOCUMENTS

| 2012/0017836 A1* | 1/2012 | Torgerson ................. A01J 7/04 |
| | | 119/14.08 |
| 2012/0097107 A1 | 4/2012 | Torgerson et al. |
| 2016/0319947 A1* | 11/2016 | Balkenhol ............... A01J 7/022 |
| 2018/0235173 A1* | 8/2018 | Torgerson ................. A01J 7/04 |

FOREIGN PATENT DOCUMENTS

| WO | WO 2019/090136 A1 | 5/2019 |
| WO | WO 2019/090136 A9 | 5/2019 |

OTHER PUBLICATIONS

International Search Report issued Feb. 8, 2022 in PCT/IB2021/060955 filed on Nov. 25, 2021, 4 pages.

* cited by examiner

*Primary Examiner* — Kelsey E Cary

(74) *Attorney, Agent, or Firm* — Oblon, McClelland, Maier & Neustadt, L.L.P.

(57) ABSTRACT

A milking system for milking dairy animals includes a milking device, a milk line for transporting milk; a cleaning device for cleaning the milk line with a cleaning liquid; a first outlet for discharging the milk to a milk tank; a second outlet for discharging the cleaning liquid; a valve mechanism for controllably connecting the milk line to one of the first outlet and the second outlet; and a control unit for controlling the valve mechanism. The valve mechanism includes a first and a second valve, and a displacement device for displacing the first or the second valve housing between a cleaning position and a milking position.

15 Claims, 5 Drawing Sheets

AUTOMATIC MILK VALVE

This application is a 371 application of PCT/IB2021/060955, filed Nov. 25, 2021 and claims benefit of NL 2026979, filed Nov. 25, 2020. The contents of each of these applications are incorporated herein by reference.

FIELD OF THE INVENTION

The present invention relates to a milking system for milking animals. The invention further relates to a valve mechanism for such a milking system.

BACKGROUND OF THE INVENTION

The milking of dairy animals, in particular cows, makes it necessary to clean the entire milking device regularly, in order to prevent milk residues from becoming deposited and bacteria and the like from multiplying in the milk residues. To this end, it is known to clean milking devices, in which case as much milk as possible is removed from the milking device first. Then, the milk residues, including, inter alia, milk fats and proteins, are removed by means of hot water containing an acid or a base, the cleaning agents. Finally, cold or lukewarm water is used to rinse in order to remove residues of the acid or alkaline cleaning liquid and to cool down the milking device for subsequent use with dairy animals. It is undesirable for the milk to come or to be able to come into contact with the cleaning agents. To this end, it is necessary to take precautions. The extent of these precautions differs for each country and/or region. In Europe, the milk and cleaning liquid are (kept) separated by a single valve, which is closed during a cleaning cycle. In the USA, it is a requirement that contamination of the milk with cleaning liquid has to be prevented at all times. This may be achieved by physically uncoupling all connection points between milk-containing lines and cleaning liquid. The physical uncoupling can easily be checked, but due to the uncoupling, it is a very dirty and manual method. There is another method which is a variant thereof and does not include the physical disconnection, but in which all connection points are provided with at least two automatic valves with an air relief point between them, known as a block-bleed-block system. This system is difficult to inspect and has to meet a great many additional (and non-defined) requirements. A third method is the use of a single-bodied mix proof double seat valve, commercially known as MPV (Mix Proof Valve), developed by Alfa Laval. The drawbacks of this valve system are the complexity and the high price.

It would therefore be desirable to provide a system which mitigates at least some of the perceived drawbacks of the prior-art.

SUMMARY OF THE INVENTION

To this end, the invention comprises a milking system for milking dairy animals, and comprising:
  at least one milking device for extracting milk from a dairy animal, and provided with a milk line for transporting milk from the milking device; and
  a cleaning device for cleaning at least the milk line with a cleaning liquid;
  and furthermore provided with
  a first outlet for discharging the extracted milk to a milk tank;
  a second outlet for discharging the cleaning liquid,
  a valve mechanism for controllably connecting the milk line to one of the first outlet and the second outlet; and
  a control unit for controlling the valve mechanism;
  wherein the valve mechanism comprises:
  a first valve with a first valve housing and a first valve body,
  a second valve with a second valve housing and a second valve body,
  a displacement device for displacing the first or the second valve housing with respect to the second or the first valve housing, respectively, between
  a cleaning position, in which there is a first fluid connection between the milk line and the second outlet for discharging the cleaning liquid, wherein the first valve housing and the second valve housing are at a distance from each other, wherein the distance is other than zero, thereby forming an opening between the first and the second valve housing, and
  a milking position, in which there is a second fluid connection between the milk line and the first outlet for discharging the extracted milk to the milk tank, and wherein the first valve housing and the second valve housing are adjacent.

The valve mechanism for the milking system is designed in such a way that that both the physical disconnection and the block-bleed-block system are used, and wherein the additional (and non-defined) requirements in the USA are met, see above.

The milking system comprises a milking device for extracting milk from a dairy animal, such as cows, sheep, goats or another dairy animal. After extraction, the milk is transported to a milk tank via a milk line. The valve mechanism is then in a milking position, in which there is a fluid connection between the milk line and the milk tank. The valve mechanism may be provided between the milk line and the first and second outlet. The valve mechanism may be coupled directly to the milk tank, without an intermediate line, i.e. the first outlet is coupled directly to the milk tank. This has the advantage that the valve on the tank side is easier to clean when the milk tank is being cleaned. When using an intermediate line, there is a risk of 'dead' spots where the cleaning liquid is not effective or to a lesser degree.

The extracted milk is discharged to the milk tank via a first outlet. In the milking position, there is a fluid connection between the milk line and the first outlet, i.e. the milk flows to the milk tank through the milk line via the first outlet.

The milking system furthermore comprises a cleaning device in order to clean at least the milk line using a cleaning agent. The milk tank may be cleaned using a second, separate cleaning device. During cleaning of the milk line, the valve mechanism is in the cleaning position in order to prevent milk from coming into contact with the cleaning liquid that is used for cleaning the milk line. When the milk tank is being cleaned, the valve mechanism may also be in the cleaning position. The milk line will have to be cleaned at shorter intervals than the milk tank, because the milk tank is cooled. When the milk tank is being cleaned, the milking device may stop milking dairy animals, so that no milk is being transported via the milk line and the valve mechanism can be in the cleaning position. When the milk line is being cleaned, the valve mechanism is in the cleaning position, so that the milk in the milk tank does not come into contact with the cleaning liquid. If the time of cleaning the milk tank coincides with that of the milk line, the milk tank will be empty, and there will not be any milk in the milk line either.

In that case, the valve mechanism will be in the cleaning position. After cleaning, the cleaning liquid is discharged via a second outlet. In the cleaning position, there is a fluid connection between the milk line and the second outlet, i.e. the cleaning liquid that is used to clean the milk line flows through the milk line via the second outlet to, for example, the sewer system or a collecting receptacle for cleaning liquid.

The cleaning device may have been installed in the milking system at a later stage, but may also have been incorporated in the milking device.

The valve mechanism comprises two valve housings and two valve bodies. If the first valve housing and the second valve housing are at a distance other than zero from each other, that is to say a space has been created between the two valve housings as a result of a physical separation, there is a first fluid connection between the milk line and the second outlet in the cleaning position. If the first valve housing and the second valve housing are adjacent to each other in the milking position, there is a second fluid connection between the milk line and the milk tank via the first outlet. The second fluid connection with the milk tank is not only interrupted by the physical separation of the valve housings in the cleaning position, but also by closing the passage openings. Both measures prevent the milk in the milk tank from being able to come into contact with the cleaning liquid for cleaning the milk line.

The first valve housing may comprise a first passage opening which is connectable to the second valve housing, and wherein the second valve housing comprises a second passage opening which is connectable to the first valve housing, the second fluid connection being formed by the first and second passage opening in the milking position. This means that, in the milking position, the passage openings of the valve housings are in fluid connection with each other. The valve housings are then adjacent, for example via an end edge of the passage openings or an end flange on each of the valve housings, and released. The passage openings of both valve housings are preferably identical in shape and size, so that their surface area is the same.

In the cleaning position, a first space may be provided between the first valve housing and the second valve housing which is such that a circumferential surface of the first space is at least equal to a surface of the first and/or second passage opening. In the cleaning position, the valve housings are a distance other than zero apart, thereby forming the first space between the valve housings. In that case, the first space between the two valve housings in the cleaning position forms the bleed of the block-bleed-block system. The bleed prevents the respective valve body from being pushed off a valve seat, so that a leak can develop. The bleed ensures that the pressure with which the liquid is being pressed in a line drops before build-up of pressure can occur. This prevents a leak from developing between the valve body and the valve housing as a result of the build-up of pressure. The two blocks are formed by the two valve bodies which close off the passage openings in the cleaning position. In the milking position, the first valve housing and the second outlet may be a distance apart, the distance being other than zero, thereby forming an opening between the first valve housing and the second outlet. What applies to the cleaning position may also apply to the milking position, namely that a second space may be provided between the first valve housing and the second outlet, which is such that a circumferential surface of the second space (a second bleed) is at least equal to a surface of the first outlet opening. In the milking position, the second bleed is a prerequisite in order to be allowed to connect the second outlet opening to a fixed discharge line to, for example, a sewer or a storage tank. The function of the second bleed is to physically separate the milking system from an outlet system (such as a sewer or a storage tank). Without the second bleed, the cleaning water could only be discharged into a drain on site.

The first and the second space may each be represented as a three-dimensional column, for example in the shape of a cylinder, or a beam. The distance between the valve housings in the cleaning position and between the first valve housing and the second outlet is preferably at least such that the surface of the longitudinal circumference of the three-dimensional column is at least equal to, but preferably larger than, the surface of the smallest passage opening or the first outlet opening, respectively. In the cleaning position, this is in line with the regulations which stipulate that the bleed surface has to be at least as large as the surface of the passage openings, preferably larger. In more general terms: the circumference of the passage opening times the distance between the valves is greater than or equal to the cross-sectional area of the passage openings.

According to one embodiment, the second outlet is released in the cleaning position and the first valve body closes off the first passage opening and the second valve body closes off the second passage opening, so that, in use, the first fluid connection is formed between the milk line and the second outlet for discharging the cleaning liquid and, in the milking position, the first valve body closes off the second outlet, the first passage opening is connected to the second passage opening and the second passage opening is released, so that, in use, the second fluid connection is formed between the milk line and first outlet for discharging the extracted milk to the milk tank.

In the cleaning position, the passage openings are closed off by the respective valve bodies and the second outlet is released. In the milking position, the passage openings are released and the first valve body closes off the second outlet, so that the milk can flow to the milk tank via the first outlet and is not discharged, for example, via the second outlet. In this way, the first valve body may be a closure body for both the first passage opening and for the second outlet.

Preferably, the first and the second valve housing are oriented in an axial direction of the first and second passage opening, with the displacement device displacing the valve housings in the axial direction with respect to each other. With such an axial movement of the valve housings with respect to each other, it is possible to achieve both the required unblocking and the required closure in a position by one single movement. In addition, the displacement device may serve one or more valve bodies for a movement in the same axial direction. Preferably, the second valve housing and the first valve body are stationary and the first valve housing and the second valve body are movable between the cleaning position and the milking position. In addition, the first valve may be provided between the second valve and the second outlet, and the second valve between the first valve and the first outlet.

In one embodiment, the first outlet is provided on the second valve housing and wherein the first valve housing is provided with the second outlet and is in addition connected to the milk line. The first valve housing may furthermore comprise an inlet opening connected to the milk line and an outlet opening connected to the second outlet, wherein the second valve housing furthermore comprises a second outlet opening connected to the first outlet for discharging the extracted milk to a milk tank. In this case, the term connected may mean 'directly coupled to or couplable to', i.e.

adjacent, or 'indirectly coupled or couplable to', in which case there is, for example, a connecting line between an opening in the valve housing and the respective inlet or outlet. If the valves are oriented differently, it is possible to arrange the various outlets and the inlet in a different way. Preferably, the first valve is a three-way valve and the second valve is a two-way valve, or vice versa.

In one embodiment, the displacement device is switched on in order to move the valve housings to the milking position, and is switched off in order to move the valve housings to the cleaning position. The cleaning position is the starting position of the valve mechanism. This means that when the displacement devices are switched off, the valves are in the cleaning position. With pneumatic and hydraulic valves, the valve mechanism will remain in the cleaning position or move towards it, should the air or liquid pressure be lost. With electric valves, this would be, for example, when the power fails. In this case, the second fluid connection with the first outlet or the milk tank is then interrupted. This reduces the risk of the milk being able to come into contact with the cleaning liquid if the displacement device fails during or just before cleaning of the milking system.

Preferably, the first outlet comprises a direct coupling between a valve housing of the valve mechanism and an inlet opening of the milk tank. In this case, the valve housing which is released in the milking position is directly coupled, without an intermediate line, to the inlet opening of the milk tank. This may be achieved by matching the diameter of the valve housing to the diameter of the inlet opening, for example by fitting (welding) a valve housing having the same inner diameter as the inlet opening of the tank to the inlet opening, or by a coupling piece which does not form an intermediate line. The dimensions of the first valve housing may be adapted to match the inner and/or outer diameter of the milk line, and/or the dimensions of the second valve housing may be adapted to match the inner and/or outer diameter of the inlet opening of the tank, a connecting line or an annular line. Preferably, at least the inner diameter of the lines to be connected is identical to that of the valve housing and/or inlet opening. This prevents accumulation of milk residues or other dirt at the junctions in the lines.

In one embodiment, the second outlet comprises a discharge line for discharging the cleaning liquid. The second outlet may comprise a direct connection to the sewer system, or a discharge to a storage tank, for example for re-use.

In one embodiment, the milking system comprises a cover for covering at least the opening between the first and the second valve housing in the cleaning position, wherein the cover extends over at least a width of the opening and at least a part of the circumference of the opening. The cover may cover the entire valve mechanism. Preferably, the cover extends over the opening between the first and the second valve housing in the cleaning position and a part of the two valve housings. This prevents dirt, objects and/or body parts from becoming trapped. If dirt or an object comes between the two valve housings, the two valve housings cannot assume the milking position, as a result of which the milk cannot be discharged to the milk tank. In the milking position, there may be an opening between the first valve and the second outlet, or the discharge line for the cleaning water. The cover may be dimensioned such that it also covers this opening in the milking position, so that no dirt, objects and/or body parts can enter there either.

Preferably, the cover has an opening via which liquids, such as water, milk and/or cleaning liquid, can flow away, for example in the form of a gap. The opening has at least the same surface area as the passage opening of the valve housing, corresponding to the circumferential surface of the space between the valve housings in the cleaning position, as described above. The gap preferably runs in the axial direction and preferably extends from a first to a second end of the cover. The cover may be column-shaped, but is preferably cylindrical.

The invention also relates to a valve mechanism for a milking system as described above, wherein the valve mechanism is configured to, in use, controllably bring the milk line in fluid connection with one of the first outlet and the second outlet, the valve mechanism comprising:
  a first valve with a first valve housing and a first valve body,
  a second valve with a second valve housing and a second valve body,
  a displacement device for displacing the first or the second valve housing with respect to the second or the first valve housing, respectively, between
  a cleaning position, in which there is a first fluid connection between the milk line and the second outlet for discharging the cleaning liquid, wherein the first valve housing and the second valve housing are at a distance from each other, wherein the distance is other than zero, thereby forming an opening between the first and the second valve housing,
and
  a milking position, in which there is a second fluid connection between the milk line and the first outlet for discharging the extracted milk to the milk tank, and wherein the first valve housing and the second valve housing are adjacent.

According to one embodiment, one of the first or the second valve is connectable to the milk line and the other one of the second or the first valve is connectable to the second outlet. Preferably, the first valve housing comprises an inlet opening connectable to the milk line and an outlet opening connectable to the second outlet, wherein the second valve housing comprises a second outlet opening connectable to the first outlet for discharging the extracted milk to a milk tank. The valve mechanism can be arranged between a milk line and a milk tank.

The valve mechanism is placeable near or to the milk tank, in which case 'near' means that the first outlet is a connecting line to the milk tank. The expression 'to the milk tank' means that the milk tank is the first outlet, in other words that the valve mechanism is directly connected to the milk tank.

DETAILED DESCRIPTION OF THE INVENTION

Figure 1:
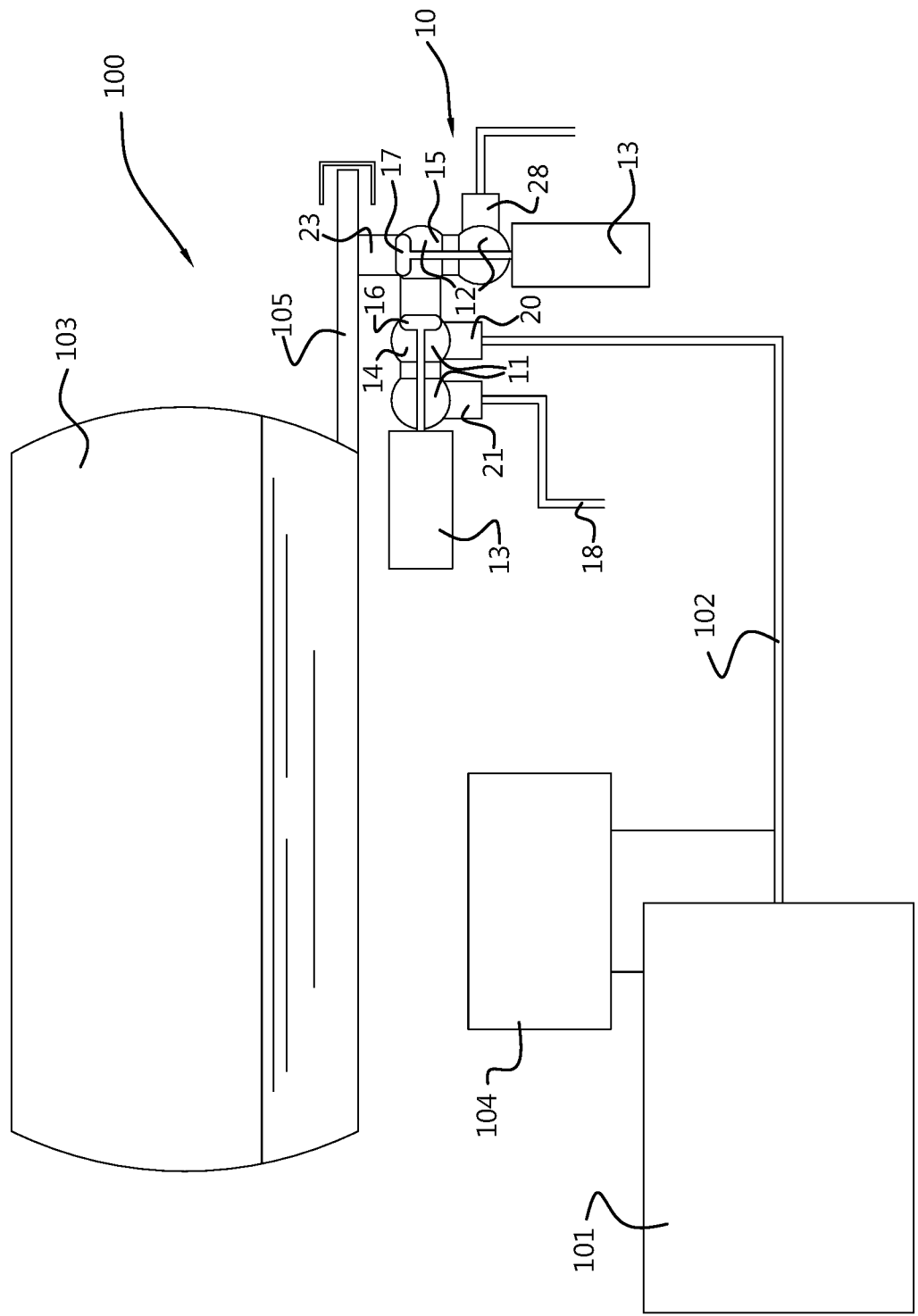
FIG. 1 shows a milking system comprising a valve mechanism according to the invention.

FIG. 1 shows a milking system 100 comprising a valve mechanism 10. The milking system furthermore comprises a milking device 101 for milking cows and a cleaning device 104. The milking device is provided with a milk line 102 for transporting milk from the milking device to a milk tank 103. The cleaning device 104 is configured for cleaning the milking system 100, including the milking device 101 and the milk line 102. The cleaning device 104 can also be used for cleaning the milk tank 103 and the valve mechanism 10.

The valve mechanism 10 comprises a first valve 11 and a second valve 12. In addition, the valve mechanism comprises a displacement device 13 which may comprise one or more actuators for displacing the first valve 11 with respect to the second valve 12. The first valve 11 comprises a first valve housing 14 and a first valve body 16. The second valve 12 comprises a second valve housing 15 and a second valve body 17. The second valve 12 has a second outlet opening 23 which is connected to a first outlet 105 for discharging the extracted milk to a milk tank. In case one of the valves 11, 12 fails or leaks, a first space or bleed 28 is provided. This first bleed 28 is provided to carry away leaked cleaning water, so that it cannot come into contact with the milk in the milk tank 103. The first valve is connected to the milk line 102 via an inlet opening 20 and connected to a second outlet 18 via a first outlet opening 21 for discharging cleaning liquid from the cleaning device 104.

Figure 2:
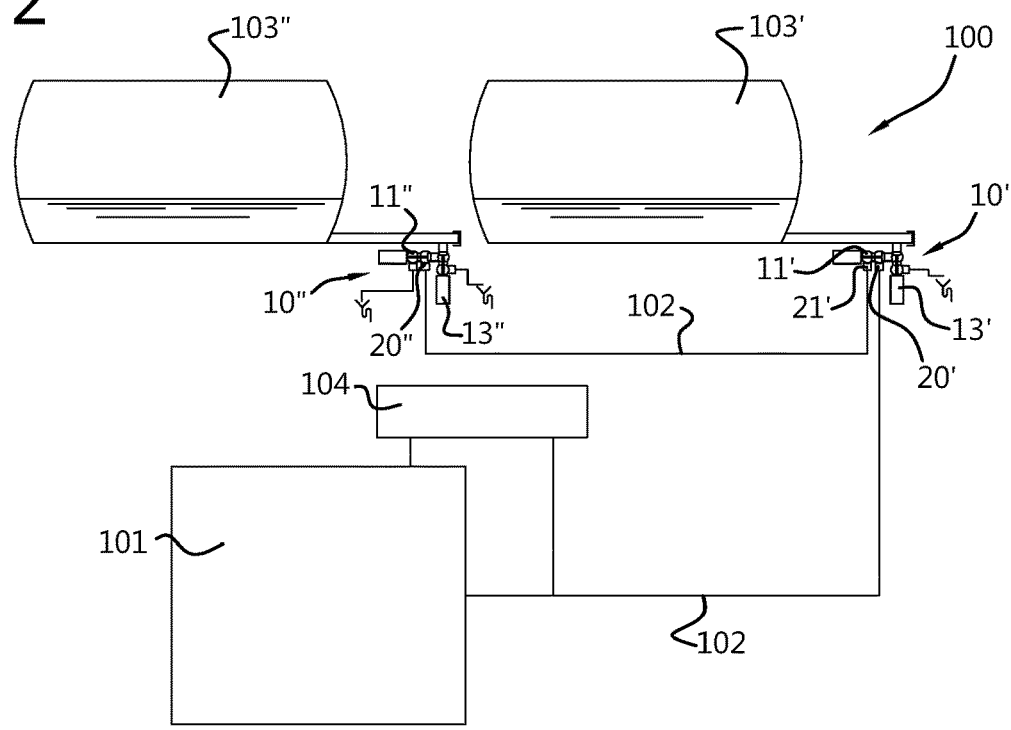
FIG. 2 shows an embodiment of the milking system with a plurality of valve mechanisms.

FIG. 2 shows an embodiment of the milking system 100 with a plurality of valve mechanisms 10 and a plurality of milk tanks 103. The milk line 102 now runs from the milking device 101 to the first valve 11" of the second valve mechanism 10" via the first valve 11' of the first valve mechanism 10'. The milk line 102 is connected to the inlet opening 20' of the first valve 11' in order to supply milk to the first milk tank 103'. The milk line 102 is furthermore connected to the inlet opening 20" of the second valve mechanism 10" via the first outlet opening 21' of the first valve mechanism 10' in order to supply milk to the second milk tank 103". In case of more than two milk tanks 103, the milk line 102 can be connected to the first outlet opening 21" of the second valve mechanism 10", etc. Forming a chain of milk tanks from a plurality of milk tanks is also referred to as 'daisy-chaining'. In this way, a plurality of milk tanks 103 can be connected to the milking device 101 with a single milk line 102 to the milk tanks 103. The milking device 101 may comprise one or more milking robots or milking carousels. It is also possible to connect two or more milking devices 101 to a milk tank by connecting two or more valve mechanisms 10 to each other via the second valve housing 15. Each milking device 101 is then connected to the milk tank 103 via a valve mechanism 10. It is also possible for the valve mechanism 10 to be connected to a cluster of milking devices, for example if the milking system 100 comprises a plurality of milking devices 101. With one valve mechanism per cluster, it is thus also possible to connect a plurality of clusters to a milk tank in the above-described way.

Figure 3:
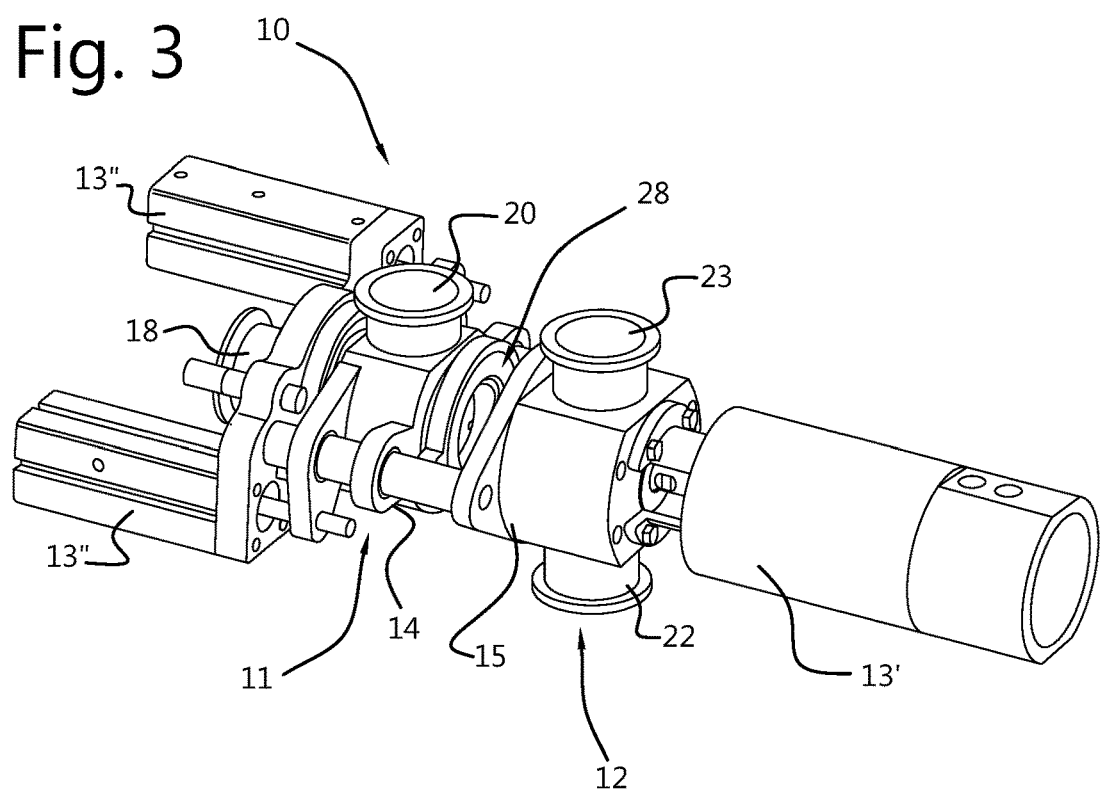
FIG. 3 shows an embodiment of the valve mechanism according to the invention.
Figure 4A:
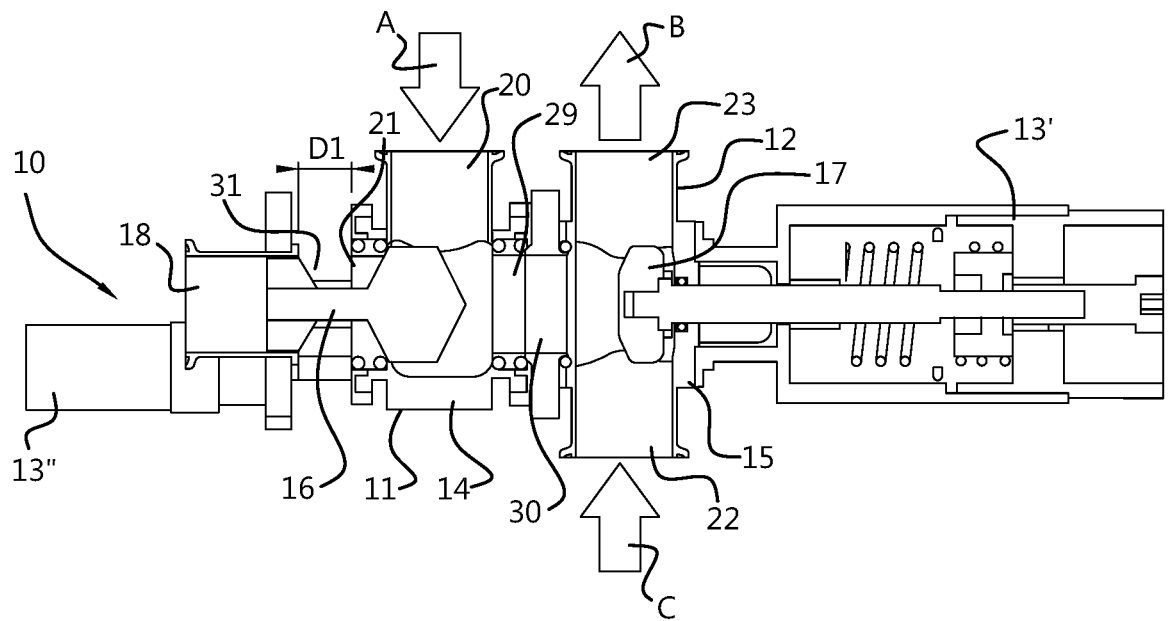
FIG. 4A shows the valve mechanism of FIG. 3 in the milking position.
Figure 4B:
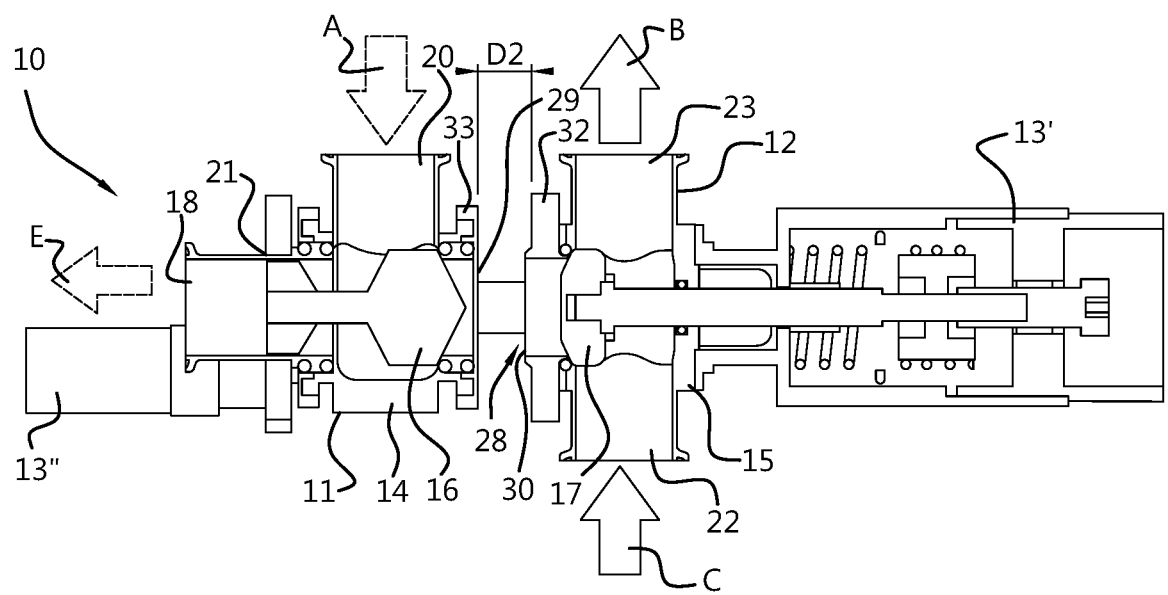
FIG. 4B shows the valve mechanism of FIG. 3 in the cleaning position.

FIGS. 3 and 4 show a first embodiment of the valve mechanism 10 according to the invention. FIG. 3 shows the valve mechanism 10 in perspective. The valve mechanism 10 comprises the displacement device 13, the first valve 11 and the second valve 12. The first valve 11 has an inlet opening 20 which is connected to the milk line 102, see FIGS. 1 and 2. The first valve 11 also has a first outlet opening 21 for discharging cleaning liquid, see FIG. 4B. In this embodiment, the displacement device 13 comprises three actuators for individually actuating the moving parts (the first valve housing 14, and the second valve body 17). Actuator 13' actuates the second valve body 17 and actuators 13" actuate the first valve housing 14. The second valve 12 has a second outlet opening 23 which is connected to the tank outflow, such as the first outlet 105 in FIGS. 1 and 2, of the milk tank 103. The second valve 12 furthermore has a piece of pipe 22 which may serve as a connection to a further valve mechanism 10, an annular line or a tank outflow. The embodiment shown in FIGS. 3 and 4 comprises a separate valve mechanism which can be fitted in a line, for example in an annular line or to the tank outflow, such as the first outlet 105 shown in FIGS. 1 and 2.

The valve mechanism 10 comprises a first valve 11 with a first valve housing 14 and a first valve body 16, and furthermore a second valve 12 with a second valve housing 15 and a second valve body 17. FIG. 4A shows the valve mechanism 10 of FIG. 3 in the milking position. In this milking position, there is a fluid connection between the first valve 11 and the second valve 12 via a first passage opening 29 and second passage opening 30 (shown in FIG. 4B). A distance D1 of a size other than zero (0) is formed between the first valve housing 14 and a second outlet 18 due to the fact that the displacement device 13 has moved the two valve housings 14, 15, with respect to each other, so that a second space or bleed 31 is formed. In the milking position, the second bleed 31 is a requirement in order to be allowed to connect the second outlet opening 23 to a fixed discharge line to, for example, a sewer or storage tank (not shown).

In the milking position, the passage openings 29, 30 are adjacent. In the milking position, the first valve body 16 unblocks the first passage opening 29 and the second valve body 17 unblocks the second passage opening 30. In addition, the first valve body 16 blocks the first outlet opening 21. If the valve mechanism 10 is incorporated in the milking system 100, as is shown in FIG. 1, the milk may, in the milking position, be discharged to the milk tank 103 through the milk line 102 via inlet opening 20, the passage openings 29, 30 and the second outlet opening 23.

FIG. 4B shows the valve mechanism 10 of FIG. 3 in the cleaning position. When the cleaning device 104 cleans the milk line 102, the cleaning liquid of the cleaning device 104 must not come into contact with the milk in the milk tank. The cleaning position of the valve mechanism 10 ensures this, as is shown in FIG. 4B. In this cleaning position, the fluid connection between the milk line 102 (via inlet opening 20) and the milk tank 103 (via the second outlet opening 23) is interrupted. The first valve housing 14 is now at a distance D2 from the second valve housing 15 because the displacement device 13 has moved the two valve housings 14, 15 with respect to each other.

In the cleaning position, the passage openings 29, 30 are not connected to each other. In the cleaning position, the first valve body 16 closes off the first passage opening 29 and the second valve body 17 closes off the second passage opening 30. In addition, the first valve body 16 unblocks the first outlet opening 21. If the valve mechanism 10 is incorporated in the milking system 100, as is shown in FIG. 1, the cleaning liquid may, in the cleaning position, be discharged to, for example the sewer system, through the milk line 102 via inlet opening 20 and the first outlet opening 21. The milk line 102 can thus be cleaned without the cleaning liquid being able to come into contact with the milk in the milk tank 103.

The valve mechanism 10 thus has two safety measures to keep milk and cleaning liquid separate from each other, namely the two valve bodies which close off the passage openings in the valve housings in the cleaning position, and the physical separation resulting from the distance between the valve housings in the cleaning position.

During the movement from the milking position to the cleaning position and vice versa, the first valve body 16 remains stationary, while the first valve housing 14 moves, and the second valve housing 15 remains stationary, while the second valve body 17 moves. In other words, the displacement device 13 only displaces the first valve housing 14 and the second valve body 17 in order to reach one of the two positions. The distances D1 and D2 are greater than 0. The fact that the two valve housings are at a distance D2 from each other in the cleaning position results in the first space or bleed 28 between the valve housings. The distance D2 is chosen to be such that the surface of the outer circumference of the first space 28 between the valve housings is greater than the surface of the passage openings. The outer circumference of the first space 28 is determined by the circumference of the passage openings 29, 30.

Figure 5:
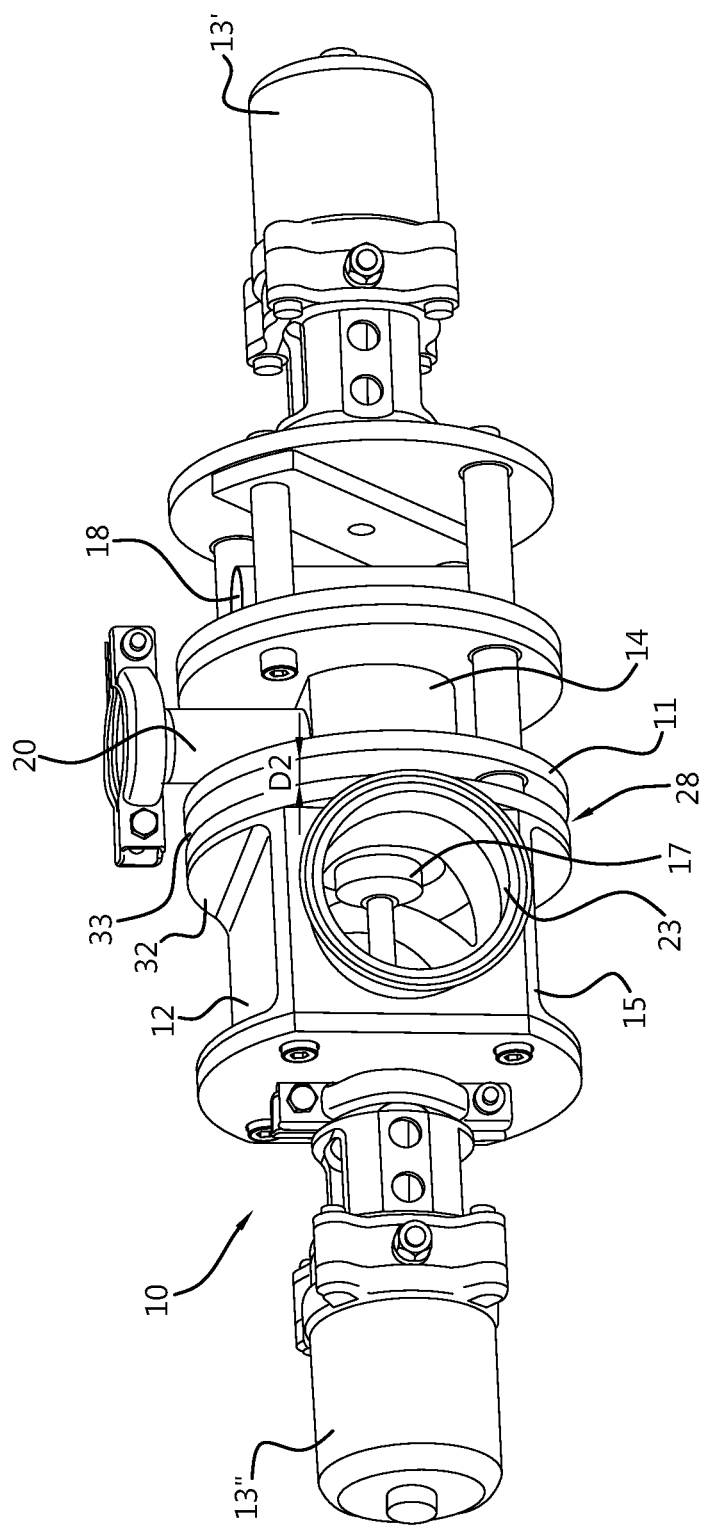
FIG. 5 shows a further embodiment of the valve mechanism according to the invention.

FIG. 5 shows a further embodiment of the valve mechanism 10 according to the invention. In this embodiment, the second valve housing 15 is configured to be directly connected to the milk tank 103. The second valve housing 15 then forms the tank outflow. To this end, the outlet opening 23 has the same dimensions as the connection opening (not shown) of the milk tank 103, preferably 2 to 5 inches, or 50 to 130 mm. FIG. 5 furthermore shows that a displacement device 13 is installed on both sides of the valve mechanism 10. The displacement device 13 comprises two actuators, with the first actuator 13' actuating the first valve 11, and the second actuator 13" actuating the second valve 12. The first valve housing 14 moves between the second outlet 18 and the second valve housing 15. Two opposite end flanges 32, 33 of the two valve housings 14, 15 are identical in shape and have identical dimensions.

With round and square passage openings, the distance between the two valve housings will have to be greater than or equal to a quarter of the height or diameter of the passage opening. In general, for all shapes of the cross section of the passage openings, the distance between the two valve housings will have to be greater than or equal to the result of the surface of the passage opening divided by the circumference of the passage opening. In practice, the passage opening will be (virtually) circular. At an inner diameter of 26 mm (approximately 1 inch), the distance D2 will have to be at least equal to 6.5 mm. Tests were performed with the embodiment from FIG. 5 with a distance D2 of 12 mm. Incidentally, the distance D1 between the first valve housing 14 and the second outlet 18 in the milking position is equal to the distance D2 between the two valve housings in the cleaning position.

Figure 6A:
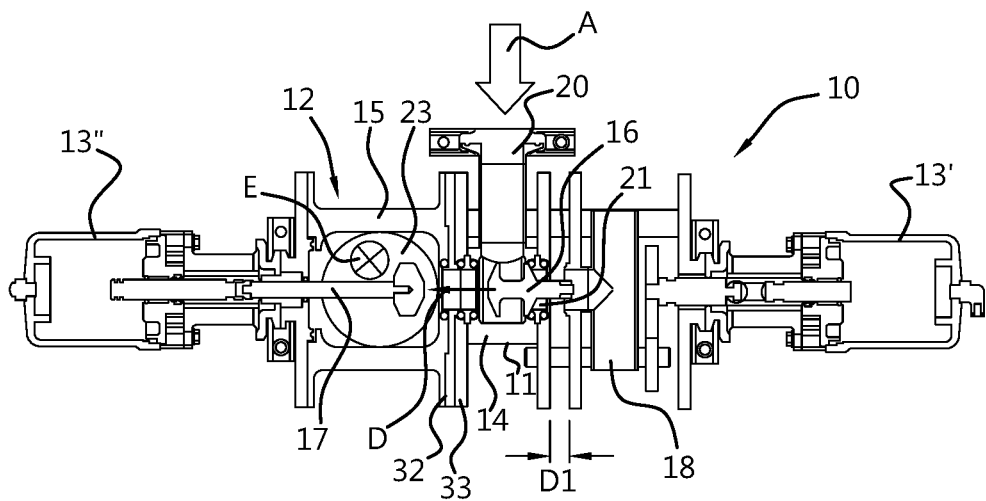
FIG. 6A shows the valve mechanism of FIG. 5 in the milking position.
Figure 6B:
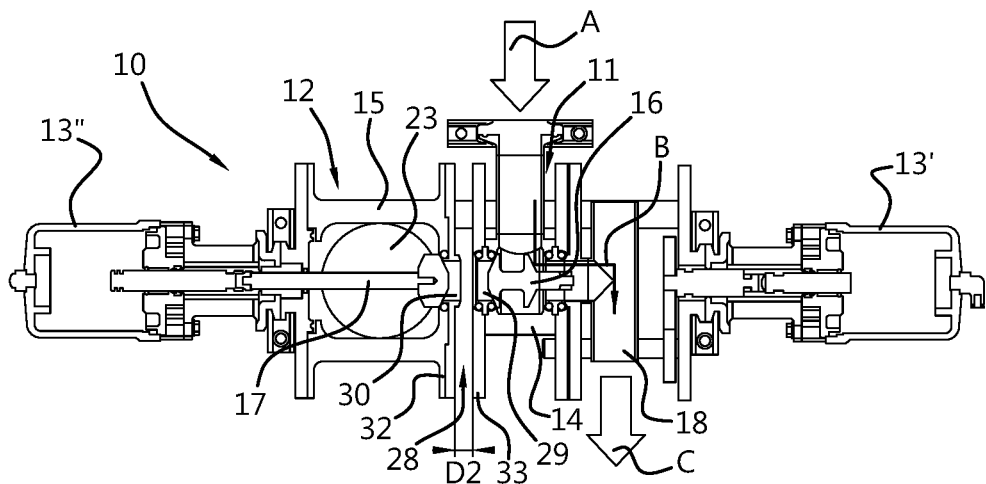
FIG. 6B shows the valve mechanism of FIG. 5 in the cleaning position.

FIG. 6A shows the valve mechanism of FIG. 5 in the milking position. In use, the milk flows via the inlet opening 20 through the passage openings 29, 30 and the outlet opening 23 to the milk tank 103, see the arrows A, D and E in FIG. 6A, in which arrow E is directed into the plane of the paper. In the milking position, the passage openings 29, 30 of the first and second valve housings 14, 15 are adjacent, so that a fluid connection between the first valve 11 and the second valve 12 is formed. In this case, the end flanges 32, 33 touch each other. In the milking position, the valve bodies 16, 17 unblock the first passage openings 29, 30. The first valve body 16 blocks the first outlet opening 21, so that the milk does not flow away via the first outlet opening 21. FIG. 6B shows the valve mechanism from FIG. 5 in the cleaning position. The cleaning position is the starting position of the valve mechanism 10. That is to say that when the displacement devices 13 are switched off, the valves 11, 12 are in the cleaning position. With pneumatic and hydraulic valves, this would be, for example, the loss of air or liquid pressure. With electrical valves, this would be, for example, when the power fails.

In order to move the valve mechanism from the milking position to the cleaning position, the second displacement device 13" moves the second valve body 17 in such a way that it blocks the second passage opening 30. Then, the first displacement device 13' moves the first valve housing 14 away from the second valve housing 15, so that the first valve body 16 blocks the first passage opening 29. In this case, the first outlet opening 21 is then released. From the cleaning position to the milking position, the first displacement device 13' moves the first valve housing 14 towards the second valve housing 15 (so that the first passage opening 29 is released and the first outlet opening 21 is blocked), after which the second displacement device 13" the second valve body 17, so that the second valve 12 is opened, i.e. the second passage opening 30 is then released. During these displacements, the first valve body 16 and the second valve housing 15 remain stationary, i.e. these components of the valve mechanism 10 are not moved by the displacement devices 13. The junction openings 29, 30 have an identical inner diameter, so that dirt and milk residues cannot accumulate at the junction between the two valve housings.

In the cleaning position, the fluid connection between the milk line 102 (via inlet opening 20) and the milk tank 103 (via the second outlet opening 23) is interrupted. The first valve housing 14 is then at a distance D2 from the second valve housing 15 (=the bleed in the block-bleed-block system), as a result of which the passage openings 29, 30 are not connected to each other (=the physical disconnection), and they are blocked by respective valve bodies 16, 17 (=the block in the block-bleed-block system). In the cleaning position, there is a fluid connection between the milk line 102 and the second outlet 18 for discharging the cleaning liquid, see the black arrows A to C in FIG. 6B.

LIST OF COMPONENTS

10. Valve mechanism
11. First valve
12. Second valve
13. Displacement device
14. First valve housing
15. Second valve housing
16. First valve body
17. Second valve body
18. Second outlet
19. Third outlet
20. Inlet opening
21. First outlet opening
22. Piece of pipe
23. Second outlet opening
28. First space
29. First passage opening
30. Second passage opening
31. Second space
32. Second end flange
33. First end flange
100. Milking system
101. Milking device
102. Milk line 103. Milk tank
104. Cleaning device
105. First outlet

The invention claimed is:

1. A milking system for milking dairy animals, comprising:
   at least one milking device for extracting milk from a dairy animal, and provided with a milk line for transporting milk from the milking device; and
   a cleaning device for cleaning at least the milk line with a cleaning liquid;
   and furthermore provided with
      a first outlet for discharging an extracted milk to a milk tank;
      a second outlet for discharging the cleaning liquid,
      a valve mechanism for controllably connecting the milk line to one of the first outlet and the second outlet; and
      a control unit for controlling the valve mechanism;
   wherein the valve mechanism comprises:
      a first valve with a first valve housing and a first valve body,
      a second valve with a second valve housing and a second valve body,
      a displacement device for displacing the first or the second valve housing with respect to the second or the first valve housing, respectively, between
      a cleaning position, in which there is a first fluid connection between the milk line and the second outlet for discharging the cleaning liquid, wherein the first valve housing and the second valve housing are at a distance from each other, wherein the distance is other than zero, thereby forming a first space between the first and the second valve housing, and
      a milking position, in which there is a second fluid connection between the milk line and the first outlet for discharging the extracted milk to the milk tank, and wherein the first valve housing and the second valve housing are adjacent.

2. The milking system according to claim 1, wherein the first valve housing comprises a first passage opening which is connectable to the second valve housing, and wherein the second valve housing comprises a second passage opening which is connectable to the first valve housing, the second fluid connection being formed by the first passage opening and second passage opening in the milking position, and wherein, in the cleaning position, the first space is provided between the first valve housing and the second valve housing and is such that a circumferential surface of the first space is at least equal to a surface of the first passage opening and/or second passage opening.

3. The milking system according to claim 2, wherein the second outlet is released in the cleaning position and the first valve body closes off the first passage opening and the second valve body closes off the second passage opening, wherein the first fluid connection is formed between the milk line and the second outlet for discharging the cleaning liquid, and
   wherein, in the milking position, the first valve body closes off the second outlet and the first passage opening is connected to the second passage opening and the second passage opening is released, wherein the second fluid connection is formed between the milk line and the first outlet for discharging the extracted milk to the milk tank.

4. The milking system according to claim 3, wherein, in the milking position, the first valve housing and the second outlet are at a distance apart, the distance being other than zero, thereby forming a second space between the first valve housing and the second outlet.

5. The milking system according to claim 1, wherein the first and the second valve housing are oriented in an axial direction of the first and second passage opening, with the displacement device displacing the valve housings in the axial direction with respect to each other.

6. The milking system according to claim 1, wherein the first valve is provided between the second valve and the second outlet, and wherein the second valve is provided between the first valve and the first outlet.

7. The milking system according to claim 1, wherein the first outlet is provided on the second valve housing and wherein the first valve housing is provided with the second outlet and is in addition connected to the milk line.

8. The milking system according to claim 2, wherein the first valve housing furthermore comprises an inlet opening connected to the milk line and a first outlet opening connected to the second outlet, wherein the second valve housing furthermore comprises a second outlet opening connected to the first outlet for discharging the extracted milk to a milk tank.

9. The milking system according to claim 1, wherein the second valve housing and the first valve body are stationary and the first valve housing and the second valve body are movable between the cleaning position and the milking position.

10. The milking system according to claim 1, wherein the displacement device is switched on in order to move the first valve housing and the second valve housing to the milking position, and is switched off in order to move the first valve housing and the second valve housing to the cleaning position.

11. The milking system according to claim 1, wherein the first outlet comprises a direct coupling between one of the first valve housing and the second valve housing of the valve mechanism and an inlet opening of the milk tank.

12. The milking system according to claim 1, comprising a cover for covering at least an opening between the first valve housing and the second valve housing in the cleaning position, wherein the cover extends over at least a width of the opening and at least a part of the circumference of the opening.

13. The milking system according to claim 1, wherein the second outlet comprises a discharge line for discharging the cleaning liquid.

14. A valve mechanism for a milking system, wherein the valve mechanism is configured to controllably bring a milk line in a fluid connection with one of a first outlet and a second outlet, the valve mechanism comprising:
   a first valve with a first valve housing and a first valve body,
   a second valve with a second valve housing and a second valve body,
   a displacement device for displacing the first valve housing or the second valve housing with respect to the second valve housing or the first valve housing, respectively, between
   a cleaning position, in which there is a first fluid connection between the milk line and the second outlet for discharging the cleaning liquid, wherein the first valve housing and the second valve housing are at a distance from each other, wherein the distance is other than zero, thereby forming a first space between the first and the second valve housing, and a milking position, in which there is a second fluid connection between the milk line and the first outlet for discharging the extracted milk to the milk tank, and wherein the first valve housing and the second valve housing are adjacent.

15. The valve mechanism according to claim 14, wherein one of the first valve or the second valve is connectable to the milk line and the other of the second valve or the first valve is connectable to the second outlet.

* * * * *